(12) United States Patent
Chen et al.

(10) Patent No.: US 8,915,178 B2
(45) Date of Patent: Dec. 23, 2014

(54) MINUTE PRESSURE GRILL

(75) Inventors: Hui Chen, Zhangzhou (CN); Yueqing Chen, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 219 days.

(21) Appl. No.: 13/310,998

(22) Filed: Dec. 5, 2011

(65) Prior Publication Data

US 2012/0137895 A1 Jun. 7, 2012

(30) Foreign Application Priority Data

Dec. 6, 2010 (CN) .......................... 2010 2 0645234

(51) Int. Cl.
*A47J 37/06* (2006.01)

(52) U.S. Cl.
CPC ................................. *A47J 37/0611* (2013.01)
USPC .................................. 99/351; 99/349; 99/372

(58) Field of Classification Search
USPC ........... 99/351, 372, 373, 374, 375, 376, 377, 99/378, 379, 380, 381, 382, 383, 384; 16/444, 445, 110.1, 113.1, 114.1, 408, 16/436, 438, 446; 220/764, 763, 762, 756, 220/760
See application file for complete search history.

(56) References Cited

U.S. PATENT DOCUMENTS

| | | | | |
|---|---|---|---|---|
| 1,977,237 A * | 10/1934 | Methe | ............................. | 99/379 |
| 2,033,067 A * | 3/1936 | Fromknecht | .................... | 99/375 |
| 3,332,559 A * | 7/1967 | Loveland | ....................... | 414/739 |
| 3,704,550 A * | 12/1972 | Hancock | .......................... | 49/386 |
| 3,712,287 A * | 1/1973 | Summers, Jr. | ................ | 126/191 |
| 3,731,663 A * | 5/1973 | Hollins | .......................... | 123/397 |
| 3,776,124 A * | 12/1973 | Morley | ............................ | 99/335 |
| 6,205,914 B1 * | 3/2001 | McCarney | ....................... | 99/349 |
| 6,269,738 B1 * | 8/2001 | Huang | ............................. | 99/375 |
| 6,276,263 B1 * | 8/2001 | Huang | ............................. | 99/375 |
| 6,321,639 B1 * | 11/2001 | Misceo | ............................ | 99/332 |
| 6,439,108 B1 * | 8/2002 | Wu | .................................. | 99/349 |
| 6,539,581 B1 * | 4/2003 | Faringosi | ........................ | 16/327 |
| 7,252,082 B2 * | 8/2007 | Bartmann et al. | ............. | 126/191 |
| 7,514,655 B2 * | 4/2009 | Fernandez et al. | ............ | 219/524 |
| 8,261,657 B2 * | 9/2012 | Serra et al. | ....................... | 99/380 |
| 2005/0005777 A1 * | 1/2005 | Steinberg et al. | ................ | 99/349 |
| 2007/0006740 A1 * | 1/2007 | Lam | ................................. | 99/372 |
| 2007/0157823 A1 * | 7/2007 | Cohen et al. | ..................... | 99/372 |
| 2009/0000490 A1 * | 1/2009 | Krasznai | .......................... | 99/376 |
| 2009/0308260 A1 * | 12/2009 | Trost | ................................ | 99/349 |

* cited by examiner

*Primary Examiner* — Henry Yuen
*Assistant Examiner* — Jimmy Chou
(74) *Attorney, Agent, or Firm* — Rabin & Berdo, P.C.

(57) ABSTRACT

A minute pressure grill includes an upper grill unit and a lower grill unit. It further includes a U-shaped lift pole, which is rotately connected to the two sides of the upper grill unit. The two ends of the U-shaped lift pole are separately disposed with a first cavity. The first cavity is disposed with a pressure spring and a J-shaped lock catch to drive the pressure spring to compress or release. A pair of arc lead rails are disposed separately on the two sides of the lower grill unit. With the rotation of the J-shaped lock catch inside the U-shaped front pole and the J-shaped lock catch is compressed tightly to the arc lead rails, the food is pressed by the upper grill unit. The food is pressed with the cooperation of the pressure spring and the lock catch.

2 Claims, 5 Drawing Sheets

MINUTE PRESSURE GRILL

FIELD OF THE INVENTION

The present invention relates to a grill, especially to a minute pressure grill.

BACKGROUND OF THE INVENTION

The existing grill utilizes pressure upon the food from the force of the gravity of the upper grill unit of the grill during grilling. There is a required gravity of the upper grill unit for good pressure effect, which is against light grill. Furthermore, if the food is too thick, the pressure effect is not markedly obvious with the force of the gravity of the upper grill unit, especially for food with high amount oil, such as the burger meat.

SUMMARY OF THE INVENTION

The object of the present invention is to solve the technical problem of the existing technology, providing with a minute pressure grill. the minute pressure grill includes an upper grill unit and a lower grill unit, and further includes a U-shaped lift pole, which is rotatably connected to the two sides of the upper grill unit; the two ends of the U-shaped lift pole are separately disposed with a first cavity, which is disposed with a pressure spring and a J-shaped lock catch to drive the pressure spring to compress or release; two arc lead rails, which are separately disposed in the both sides of the lower grill unit; the arc lead rails is used to lock catch the J-shaped lock catch.

As another preferred proposal, the free length of the pressure spring is longer than the length of the first cavity.

As another preferred proposal, the J-shaped lock catch is passed through the spindle of the pressure spring.

As another preferred proposal, the U-shaped lift pole includes a U-shaped front pole and two rear poles, the two rear poles are fixed to the upper grill unit and separately disposed with a joint, the U shape front pole is rotately connected to the two rear poles by the joints.

As another preferred proposal, the ends of the two rear poles are disposed with a lock hole, a movable lever is disposed inside the U-shaped front pole, the two ends of the lever are separately disposed with a T-shaped wedge block, which is matching to the lock hole.

As another preferred proposal, the U-shaped front pole is disposed two second cavities inside, the second cavities are separately locked catch to the T-shaped wedge block and disposed with a returning spring inside, the lever is passed through the spindles of the two returning springs.

As another preferred proposal, the free length of the returning spring is longer than the length of the second cavity.

As another preferred proposal, the U-shaped front pole is disposed with a pull-rod operator to pull the lever.

The technical proposal of the present invention has the advantages below: with the rotation of the J-shaped lock catch inside the U-shaped front pole and the J-shaped lock catch is compressed tightly to the arc lead rails, the food is pressed by the upper grill unit with good pressure effect. Meanwhile, the food is pressed stably with the cooperation of the pressure spring and the J-shaped lock catch.

DETAILED DESCRIPTION OF THE EMBODIMENT

Figure 1:
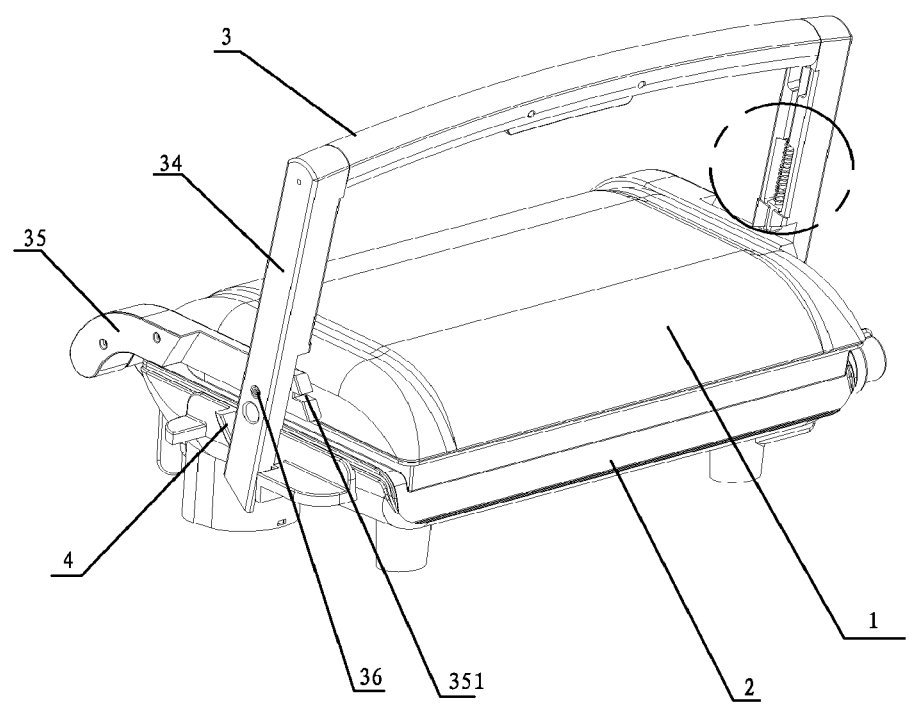
FIG. 1 illustrates the structure of the minute pressure grill in the present invention.
Figure 2:
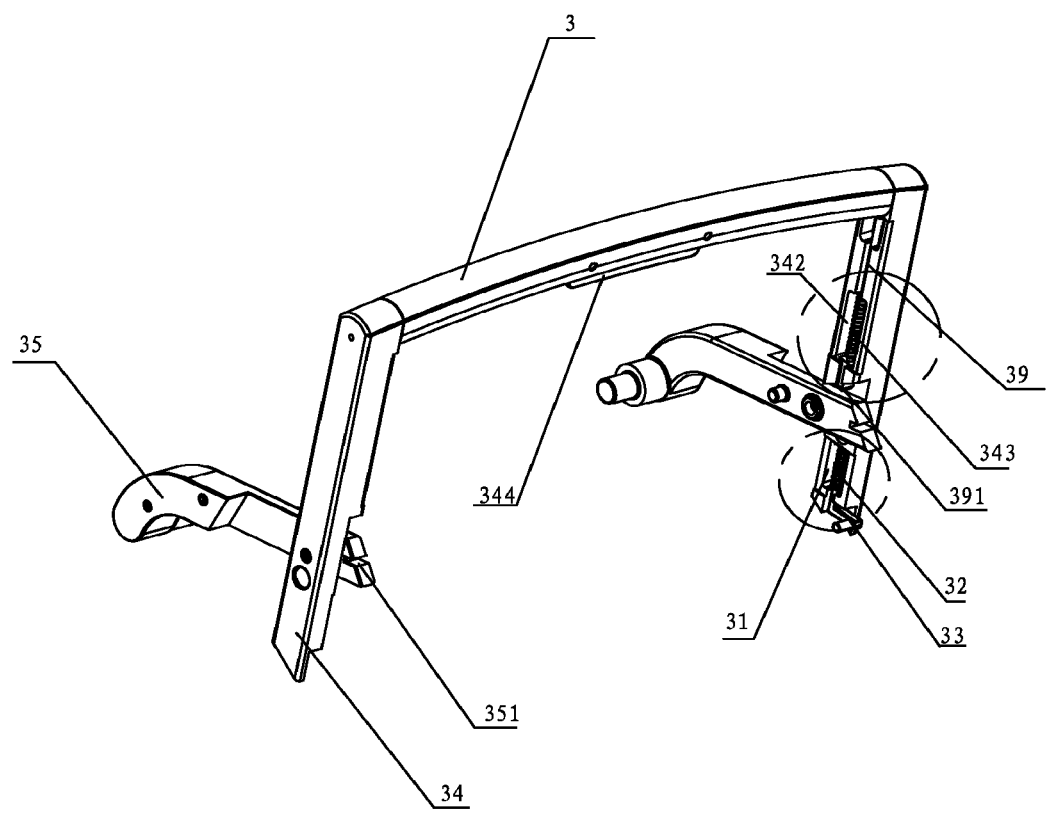
FIG. 2 illustrates the structure of the U-shaped lift pole and the lever in the present invention.

The present invention will be further described with the drawings and the embodiment.

Referring to the FIGS. 1, 2, 4 and 5, the minute pressure grill of the present invention includes an upper grill unit 1 and a lower grill unit 2. It further includes a U-shaped lift pole 3, which is rotatably connected to the two sides of the upper grill unit 1. The two ends of the U-shaped lift pole 3 are separately provided with a first cavity 31, which are provided with a J-shaped lock catch 33 and a pressure spring 32 sleeved over the J-shaped lock catch 33. The J-shaped lock catch 33 drives the pressure spring 32 to compress or release; two arc lead rails 4 to lock catch the J-shaped lock catch 33 are disposed at the two sides of the lower grill unit 2. Preferably, the J-shaped lock catch 33 is passed through the spindle (center) of the pressure spring 32.

The U-shaped lift pole 3 includes a U-shaped front pole 34 and two rear poles 35. The two rear poles 35 are fixed to the upper grill unit 1 and disposed with a joint 36 separately. The two rear poles 35 are rotately connected to the lower grill unit 2, rotating relatively to the lower grill unit 2 with the upper grill unit 1. The U-shaped front pole 34 is rotately connected to the rear poles 35 through the joint 36. The ends of the rear poles 35 are separately disposed with a lock hole 351. The U-shaped front pole 34 is disposed with a movable lever 39 inside. The two ends of the lever 39 are separately disposed with a T-shaped wedge block 391, which is matching to the lock hole 351. The T-shaped wedge block 391 can be wedged into the lock hole 351. The U-shaped front pole 34 is disposed with two second cavities 342 inside. The second cavities 342 are locked connected to the T-shaped wedge block 392 and separately disposed with a returning spring 343. The lever 39 is passed through the spindles of the two returning spring 343 to drive the returning spring 343 compress or release. The U-shaped front pole 34 is disposed with a pull-rod operator 344 to pull the lever 39. The natural length of the pressure spring 32 is longer than the length of the first cavity 31. The pressure spring 32 is compressed inside of the first cavity 31. The natural length of the returning spring 343 is longer than the length of the second cavity 342. The returning spring 343 is compressed inside of the second cavity 342. The natural length of the springs is the unstretched and uncompressed length of the springs.

Figure 3:
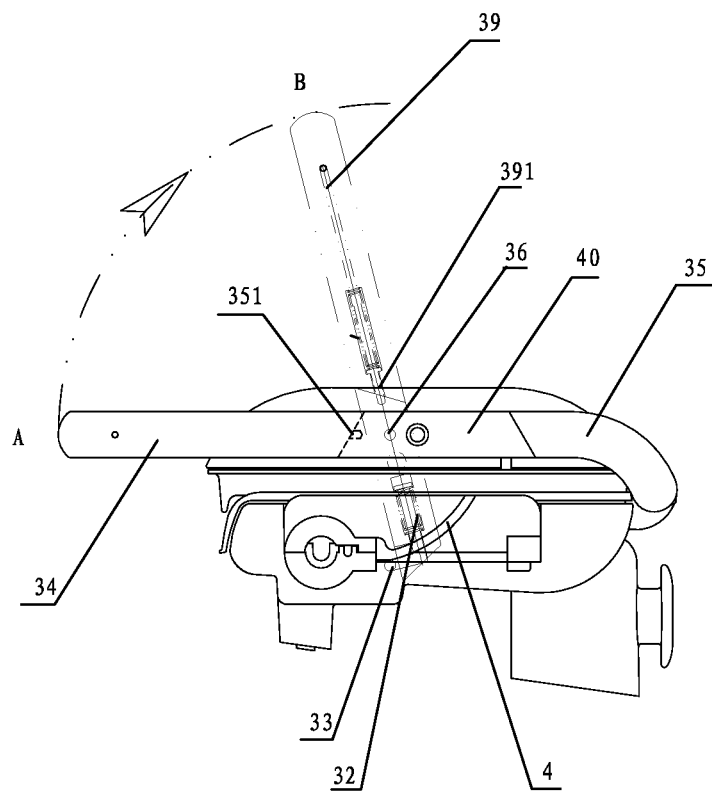
FIG. 3 illustrates the rotation of the U-shaped lift pole in the present inventions
Figure 4:
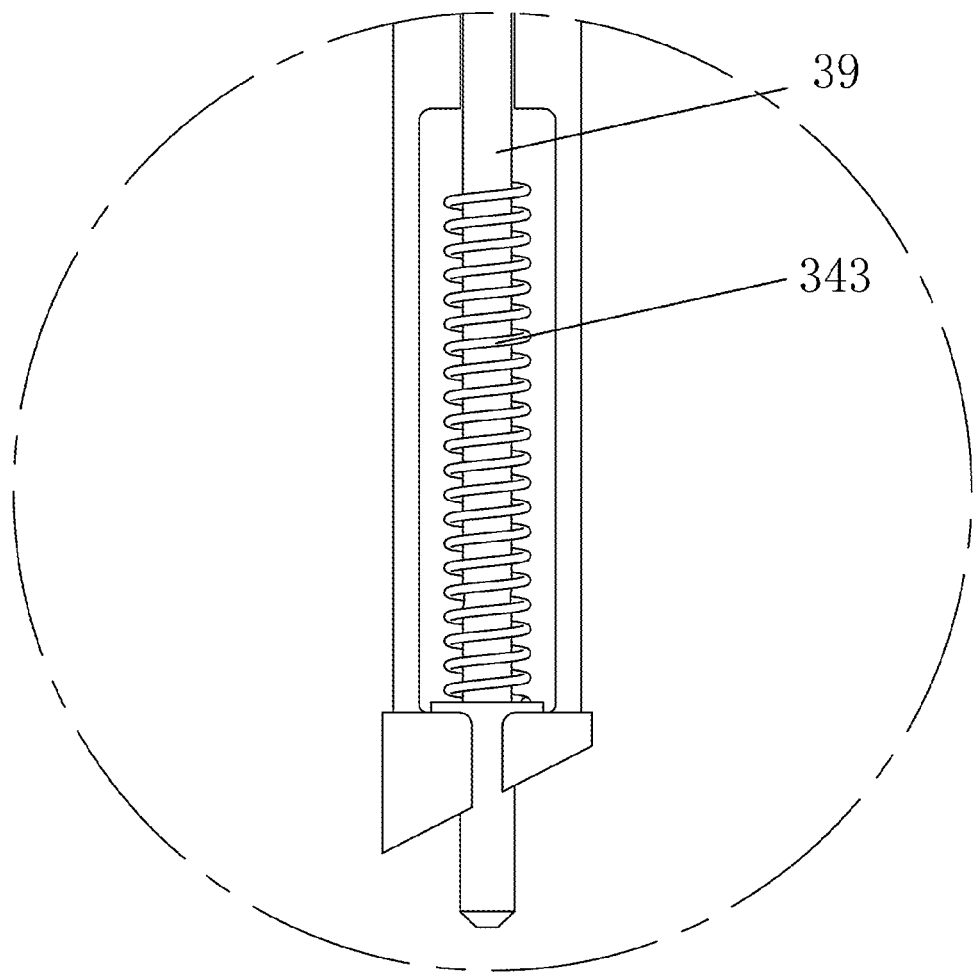
FIGS. 4 and 5 are enlarged views of the lock catch and wedge block.
Figure 5:
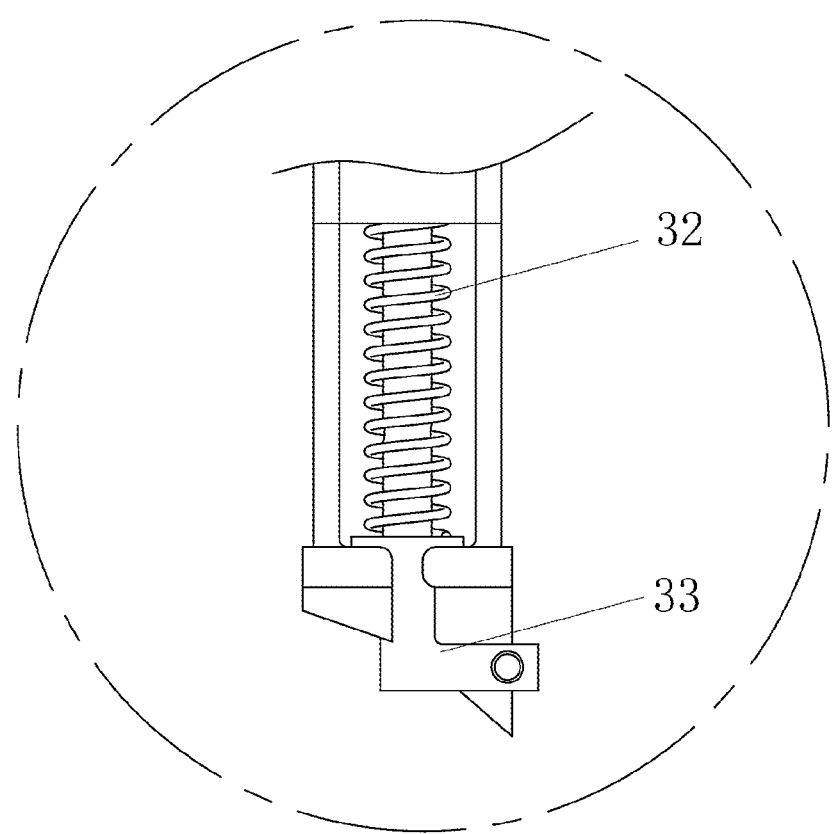

The working process of the present invention is further described with the FIG. 3.

FIG. 3 illustrates the rotation of the U-shaped front lift pole 34 from the uncompress state (the A state) to the compress state (the B state). When the U-shaped front pole 34 is situated in the A state, the U-shaped front pole 34 is level with the two rear pole 35. press the pull-rod operator 344 (as figured in the FIG. 2), the wedge block 391 of the lever 39 is broken away from the lock hole 351 by the driven of the pull-rod operator 344. meanwhile, the U-shaped front pole 34 rotates on the joint 36. the J-shaped lock catch 35 is gradually compressed tightly to the arc rail 4 to compress the pressure spring 32, driving the rear poles 35 fixed on the upper grill unit 1 to compress downward to achieve stably compress effect.

Although the present invention has been described with reference to the preferred embodiments thereof for carrying out the invention, it is apparent to those skilled in the art that a variety of modifications and changes may be made without departing from the scope of the present invention which is intended to be defined by the appended claims.

What is claimed is:

1. A minute pressure grill, comprising:

an upper grill unit;

a lower grill unit;

a U-shaped lift pole having two ends rotatably connected to two sides of the upper grill unit, each of the ends being provided with a first cavity, each of the first cavities having therein a J-shaped lock catch and a pressure spring sleeved over the J-shaped lock catch, the J-shaped lock catch driving the pressure spring to compress or release, the U-shaped lift pole further including a U-shaped front pole and two rear poles, the two rear poles being fixed to the upper grill unit and each being provided with a joint, the U-shaped front pole being rotatably connected to the two rear poles by the joints, each of the rear poles having an end and a lock hole in the end of the rear pole, a movable lever having two ends being disposed inside the U-shaped front pole, each of the ends of the movable lever having a T-shaped wedge block, which engages with a respective lock hole, the U-shaped front pole having two second cavities therein, each of the second cavities having a returning spring therein, the movable lever passing through a center of the returning springs; and two arc lead rails, each being disposed on a respective side of the lower grill unit, each arc lead rails lock catching a respective J-shaped lock catch.

2. A minute pressure grill according to the claim 1, wherein the U-shaped front pole is provided with a pull-rod operator to pull the movable lever.

* * * * *